April 6, 1965 L. A. ATTERMEYER 3,176,589
KEYWAY CUTTING MACHINE
Original Filed Aug. 8, 1957 4 Sheets-Sheet 1
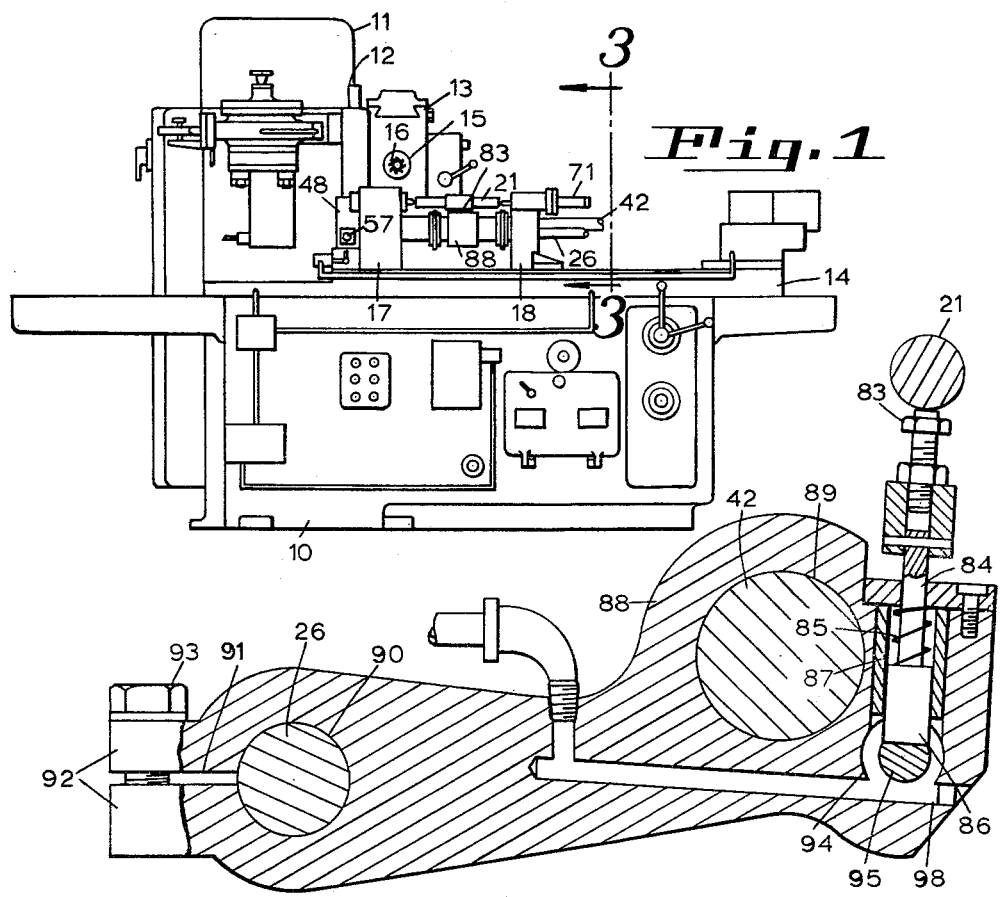
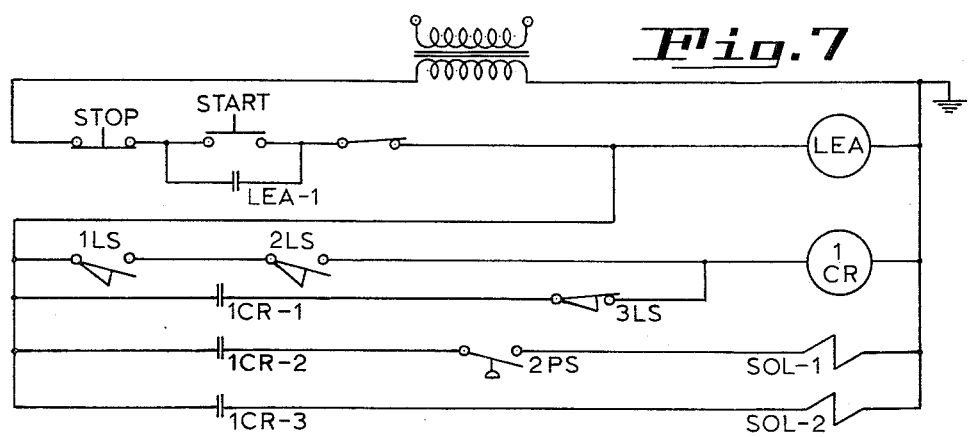

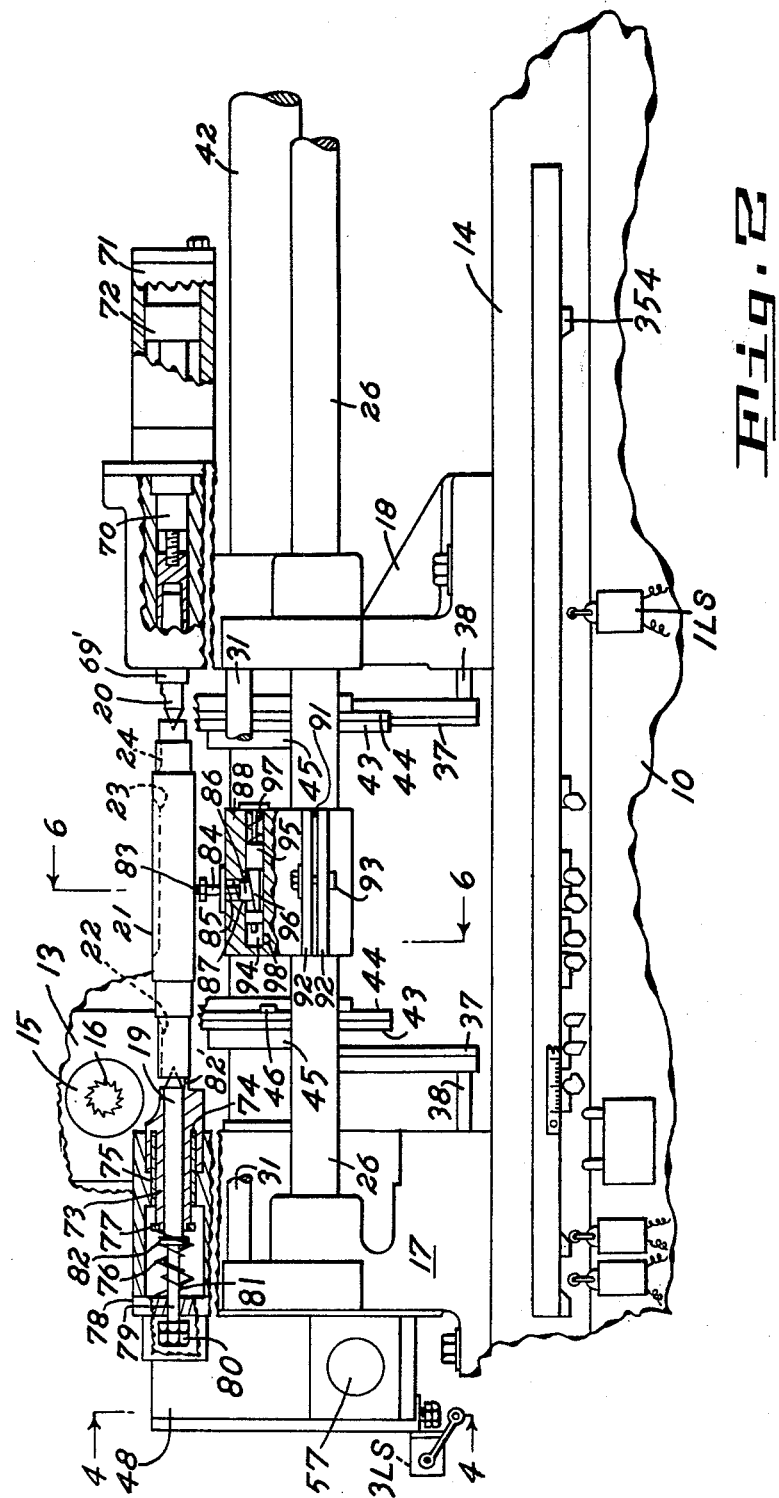

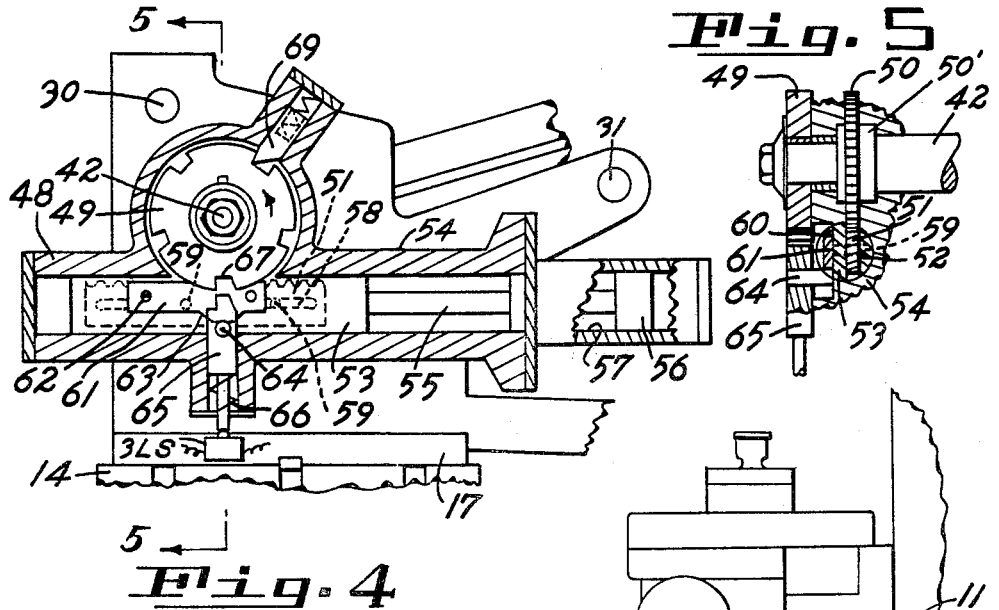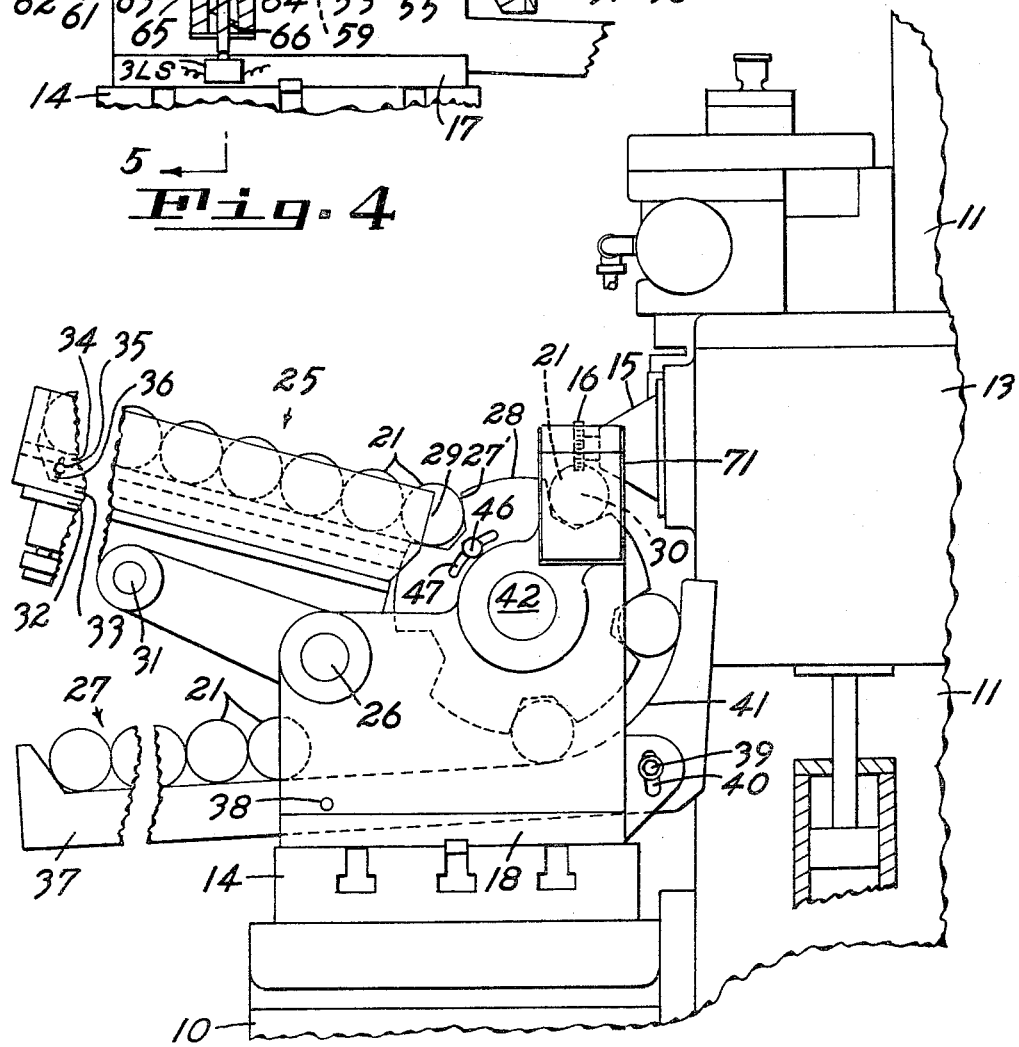

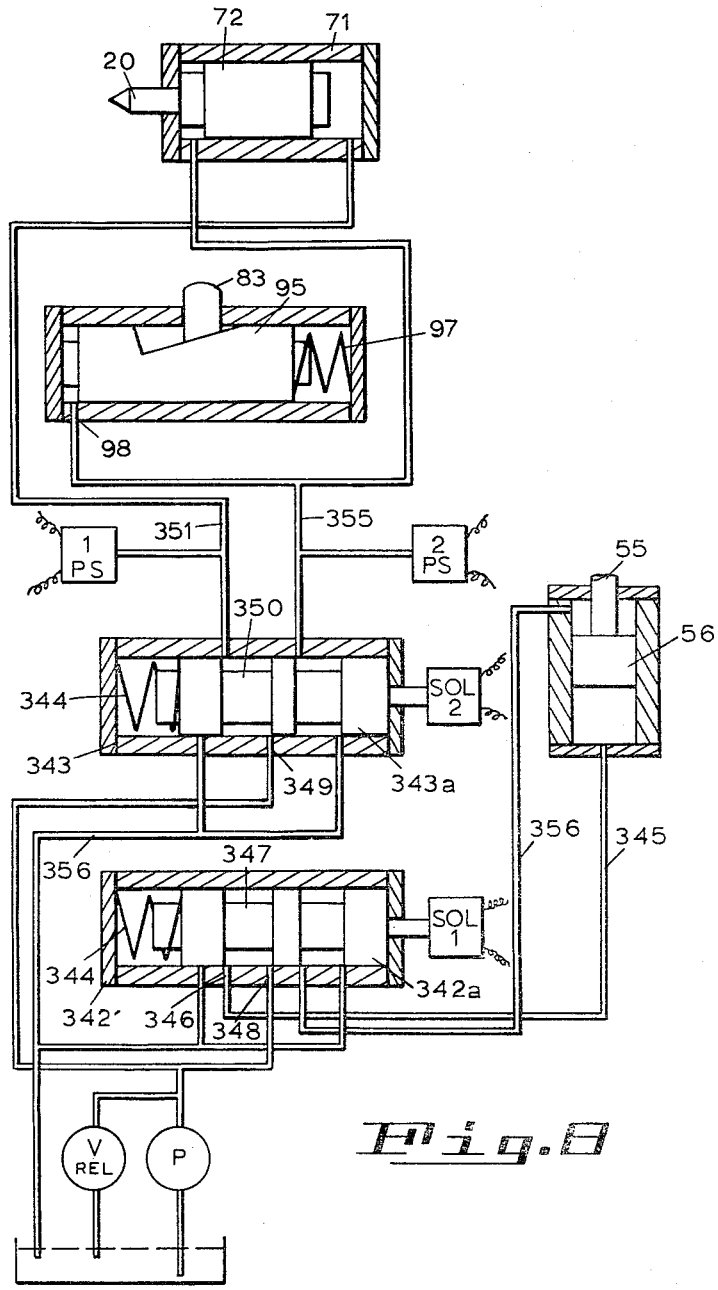

United States Patent Office 3,176,589
Patented Apr. 6, 1965

3,176,589
KEYWAY CUTTING MACHINE
Lawrence A. Attermeyer, Cincinnati, Ohio, assignor to The Cincinnati Milling Machine Co., Cincinnati, Ohio, a corporation of Ohio
Original application Aug. 8, 1957, Ser. No. 676,960, now Patent No. 3,018,696, dated Jan. 30, 1962. Divided and this application Apr. 4, 1961, Ser. No. 101,040
1 Claim. (Cl. 90—21)

This invention relates to milling machines and more particularly to a new and improved machine for spline milling and the like. The present application is a division of my co-pending patent application, Serial No. 676,960, filed August 8, 1957, for Keyway Cutting Machine, now U.S. Patent No. 3,018,696.

One of the objects of this invention is to provide a new and improved machine for milling a series of splines or keyways in a shaft or the like automatically in succession.

Another object of this invention is to provide a new and improved milling machine for cutting a series of slots in a work piece at different spacings and of different depths automatically in succession.

A further object of this invention is to provide an automatic machine for keyway slotting shafts and the like having an automatic cycle control mechanism for controlling automatic loading of work in the machine, the feed and rapid traverse mechanism for moving the work relative to the cutter, the feed and rapid traverse mechanism for sinking a cutter to depth in the work, automatically adjustable stop means for limiting the depth of the cutter, and means to automatically unload the work and return the machine parts to starting position.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claim, without departing from or exceeding the spirit of the invention.

In the drawings in which like reference numerals indicate like or similar parts:

FIGURE 1 is a front elevation of a machine embodying the principles of this invention.

FIGURE 2 is an enlarged front view of the work supporting mechanism.

FIGURE 3 is a section on the line 3—3 of FIGURE 1.

FIGURE 4 is a section on the line 4—4 of FIGURE 3.

FIGURE 5 is a detailed section on the line 5—5 of FIGURE 4.

FIGURE 6 is a section on the line 6—6 of FIGURE 2.

FIGURE 7 is a diagram of the electrical control circuit.

FIGURE 8 is a diagram of the hydraulic control circuit.

Referring to the drawings and more particularly to FIGURE 1, there is shown a milling machine embodying the principles of this invention in which the reference numeral 10 indicates, in general, the bed of the machine from the rear of which a column 11 extends upwardly having guideways 12 formed thereon for mounting a spindle carrier 13 for vertical movement toward and from a work supporting table 14 horizontally guided on the bed 10. The spindle carrier has a cutter spindle 15 journaled therein which supports a rotatable cutter 16.

The table 14 has mounted thereon a headstock unit indicated generally by the reference numeral 17, and a tailstock unit indicated generally by the reference numeral 18. The headstock unit, as shown in FIGURE 2, has a work supporting center 19, and a tailstock unit has a center indicated by the reference numeral 20. A work piece 21 is shown in FIGURE 2 supported by the centers 19 and 20, but in this machine the work is not rotated on the centers, but is held against rotation so that keyways such as 22, 23, and 24 may be cut therein along one side of the work.

Between the headstock and tailstock there is mounted a work loading mechanism, shown more particularly in FIGURE 3, comprising a loading magazine chute, indicated generally by the reference numeral 25, pivotally mounted and adjustable on a shaft 26, and a delivery magazine chute 27 located below the chute 25. The work pieces 21 roll down the chute 25 upon which they are manually placed by the operator into a work receiving slot 27' formed in an indexible work carrier 28. This carrier has a number of slots, and as the carrier is indexed a work piece is moved from the position 29 to a machining position 30. Further indexing carries the work piece around and deposits it in the delivery chute 27 from which the work is manually removed by the operator.

The loading magazine or chute has one end supported on the shaft 26 and the other end supported on a rod 31 which extends lengthwise from the headstock 17 to the tailstock 18. The floor plate 32 of the chute 25 has an angle bracket 33 welded thereto, and a work carrying rail 34 is attached to the angle bracket by screws 35 which pass through elongated holes 36 in the rail so that the rail may be adjusted up or down in accordance with the diameter of the work and to align the center of the work properly in line with the slot in the indexible carrier.

The delivery chute 27, comprising side rails 37, are pivotally supported on pins 38 and are clamped in angular position by clamping bolts 39 which pass through elongated slots 40 in the rails 37. This also permits the arc 41 to be adjusted relative to the periphery of the indexible carrier to accommodate different diameters of work.

The indexible work carriers 28 are spaced on a shaft 42, and each comprises a pair of plates 43 and 44, as shown in FIGURE 2, which are secured to a hub 45 keyed on the shaft 42. Notches are cut in the periphery of the plates 43 and 44 such as the slot 27' and by providing two plates one can be turned relative to the other to vary the size of the slot 27' to suit the diameter of the work, and then they are secured together by screws 46 which pass through the plates and into the hub 45 as shown in FIGURE 3, one of the plates being provided with an elongated slot 47 as shown in FIGURE 3.

It will thus be seen that the work loading and unloading mechanism, as well as the indexible carrier is adjustable for different diameters of work.

The shaft 42 to which the indexible work carriers are connected extends through the headstock 17 into a housing 48 in which is provided a mechanism for indexing the shaft 42. The indexing mechanism is shown in FIGURE 4 and comprises an index plate 49 which is keyed or otherwise secured to the end of the shaft 42 and adjacent to it, as shown in FIGURE 5 is a gear 50 which is mounted on the shaft 42 and connectible to it by a cam ratchet clutch 50' for imparting rotation thereto during one direction of rotation of the gear 50. Ratcheting takes place during the other direction of rotation of the gear 50. The gear 50 meshes with a rack 51 which is mounted in a slot 52 of a slide member 53 which in this case happens to be a piece of round shafting. The slide member 53 is suitably guided in a hole in a bracket 54 and is connected by a piston rod 55 to a piston 56 slidably mounted in a cylinder 57. Attention is invited to the fact that the rack 51 is freely slidable in the slot 52 and is provided with an elongated slot 58 through which passes pins 59 which form the motion transmitting connection between the rack 51 and the slide 53. The slide 53 is also provided with a flat face 60 to which is secured a cam member 61, as by screws 62, and this cam member has a convex cam surface 63 on one side of it which is adapted to engage a pin 64 in the index plate locking plunger 65 to effect withdrawal of the plunger. The locking plunger is normally held by a spring 66 into engagement with one of a series of index slots 67 formed in the periphery of the index plate 49.

In operation it will be seen that, as the slide 53 moves from its extreme left position, the pins 59 and the cam 63 will move with the slide until the lost motion in the slot 58 is taken up during which time the cam 63 will withdraw the locking plunger 65 while the index plate 49 and gear 50 remain stationary. A back-up plunger 69 having a beveled end remains in a slot 67 to hold the parts against rotation until the pin 59 picks up the rack 51 and starts rotation of gear 50 and the indexible shaft 42. The cam 63 will also continue its movement and allow the locking plunger to ride on the periphery of the index plate until it eventually enters the next slot therein and stops the indexing movement. The back-up plunger 69 will also enter the next slot so that upon return movement of the slide 53 and ratcheting of the gear 50 there will be no retrograde movement of the index plate and shaft. The indexing movement of the shaft 42 moves a new work piece in position between the centers 19 and 20.

After a new work piece is positioned in a slot supported by the indexible work carriers 28, the tailstock center 20 is advanced to engage the end of the work piece. The center 20 is mounted in a hollow sleeve 69', FIGURE 2, which is slidably mounted in the tailstock housing 18 and operatively connected to the end of a piston rod 70 which extends into a cylinder 71 where it is provided with a piston 72. Admittance of fluid pressure to cylinder 71 advances the tailstock center 20 which engages the end of the work piece and pushes the work toward the headstock center 19. The headstock center 19 is surrounded by a sleeve 73 which has a shoulder 74 formed on one end thereof and engageable with the end of a fixed sleeve 75 mounted in the headstock housing 17. When there is no work piece on the center, the sleeve 73 is pushed forward by a spring 76 interposed between a washer 77 located on the end of the sleeve and the fixed wall 78. This pushes the sleeve 73 to the right relative to the center 19 which is normally held in a substantially fixed position. This is accomplished by reducing the end 79 of the center and extending it through the wall 78 where its exposed end is provided with a pair of lock nuts 80. A spring 81 is interposed between the wall 78 and a washer 82 mounted on the portion 79 whereby the center 19 is held toward the right with the lock nuts 80 acting as a stop means. The end of the sleeve 73 is provided with a pair of ears 82' which are engaged by the work piece as it moves toward the left, and as the sleeve 73 is pushed toward the left it uncovers the center 19 and the work is pushed on to the center 19 until the shoulder 74 engages the end of the fixed sleeve 75. The object of the sleeve 73 is to push the work off of the center 19 after the cutting operation, and it will be obvious that when the tailstock center is retracted the sleeve 73 will move toward the right and relative to the center 19 to reposition the work on the indexible carrier so that it will clear the end of the center 19 when the indexible work carrier moves the work laterally on its indexing movement.

After the work has been clamped between the centers, a jack 83, shown in FIGURES 2, 6 and 8, is provided underneath the work piece in between the centers to support the center of the work and simultaneously provide sufficient friction to hold the work piece against rotation. The jack 83 is in the form of a plunger having a reduced portion 84 which is surrounded by a spring 85 that normally acts to retract the jack. An enlarged portion 86 is slidably mounted in a bore 87 formed in a housing 88. The housing 88 has an enlarged bore 89 by which it is supported on the shaft 42, and is provided with a second bore 90 which fits the shaft 26. The end of the housing is split at 91 which intersects the bore 90, thus providing a pair of clamping ears 92 by which the housing may be clamped in some longitudinal position on the shaft 26 by clamping bolts or the like 93. The vertical bore 87 intersects a horizontal bore or cylinder 94 in which is slidably mounted a piston 95. The end of the plunger 86 is cut at an angle to engage a wedge 96 formed in the surface of the piston 95. The piston 95 is normally urged toward the left by a spring 97, and it is the force of this spring that urges the plunger 86 against the resistance of spring 85 into engagement with the work, and therefore it should be a moderate force so as not to put so much strain on the work piece that it would cause the work piece to bend.

One end of the cylinder 94 is provided with a hydraulic connection 98 whereby hydraulic pressure may be admitted to the end of the cylinder to cause retraction of the piston 95 and thereby retraction of the jack 83. When the pressure is released, the spring 97 urges the plunger 95 to the left and thereby raises the jack 83 into engagement with the work.

Since the reloading of the work fixture occurs during the latter part of the cycle it will be assumed that a new work piece is properly secured in the machine preparatory to cutting keyways therein. This means that the plungers 342a and 343a of control valves 342' and 343 are held in their normal position as shown in FIGURE 8 by springs 344. The control valve 342' controls the work indexing piston 56 which should be held in its advanced position by pressure in line 345. This line is connected to port 346 of valve 342', and the groove 347 in valve plunger 342a is so positioned as to connect the port 346 to the pressure port 348.

The valve 343 controls the operation of the tailstock center 20 and the work rest 83, and this valve has a pressure port 349 which is connected by groove 350 in plunger 343a to channel 351 which thereby supplies pressure to tailstock piston 72 which holds the work in the machine. Channel 351 is also connected to pressure switch 1PS which is thereby held closed so long as pressure is maintained in channel 351.

The mechanism for moving the table and spindle carrier in an automatic cycle to perform the keyway cutting operations as a part of a continuous, uninterrupted cycle is shown and described in U.S. Patent No. 3,018,696 hereinabove referred to and will not be repeated here. Suffice it to say that the machine is provided with an automatic cycle control box of the type disclosed in U.S. Patent No. 2,365,043 granted December 12, 1944, to Blood et al. wherein an indexable control shaft is advanced at the end of each table or carrier movement by means of dogs adjustably mounted on the table or carrier which cooperate with valve plungers on the frame of the machine. These plungers, when depressed, cause the control shaft to be indexed and thereby initiate the next event in the machine cycle.

As the last keyway 24 is being cut, the table is traveling at a feed rate toward the left, and as it completes its movement a dog on the table effects indexing of the control shaft and, at the same time, a dog 354 on the table actuates limit switch 1LS. At this point the table stops and the spindle carrier is raised, and upon completion of its elevation, it actuates a limit switch 2LS. As shown in the electrical diagram, FIGURE 7, the simultaneous closing of 1LS and 2LS energizes the relay 1CR which closes its latching contact 1CR–1. The limit switch 3LS shown on the electrical diagram is a normally closed switch and has been so held throughout the cutting cycle. Therefore, when 1CR–1 is closed, the relay 1CR is energized which closed contacts 1CR–2 and 1CR–3 respectively in series with solenoid SOL1 and SOL2. Solenoid SOL2 will be energized first because the pressure switch 2PS in series with solenoid SOL1 is open. As shown in the hydraulic diagram, FIGURE 8, solenoid SOL2 will shift the valve plunger 343a to the left and thereby connect pressure to channel 355 and connect channel 351 to the reservoir line 356. This will cause retraction of the tailstock center 20 whereby the spring actuated sleeve 73 around the headstock center 19 will push the work piece off of the headstock center, and the work will drop slightly into the notches of the indexible work carrier 28. At the same time, of course, the work jack 83 will be withdrawn, the pressure switch 1PS will open and the pressure switch 2PS will close. This results in energization of solenoid SOL1. This solenoid will then shift the valve plunger 342a and connect the pressure port 348 to channel 356. This will cause operation of the work indexing mechanism shown in FIGURES 4 and 5 and a new work piece will be moved into cutting position.

As the locking pawl 65, shown in FIGURE 4, is withdrawn during the indexing operation, it will operate the limit switch 3LS, and this will break the circuit to relay 1CR. This immediately deenergizes solenoids SOL1 and SOL2, and they will return to their normal position shown in FIGURE 8 whereby pressure will be admitted to channel 345 to effect the ratcheting stroke of the work indexing mechanism, and admit pressure to channel 351 to effect advance of the tailstock center 20 and operation of limit switch 1PS which signals that the new workpiece has been clamped in the machine.

What is claimed is:

In a milling machine having a slidable work table and a cutter spindle carrier movable toward and from a cutting position with respect to the table, the combination of means for supporting a workpiece in cutting position longitudinally of the table including a headstock and a tailstock having axially aligned centers and spaced longitudinally of the table, an indexable work carrier interposed between said stocks for automatically positioning a workpiece therebetween, an indexing mechanism for advancing said work carrier through one step of movement to remove a finished workpiece from between the stocks and to position an unfinished workpiece therebetween, a work supporting jack mounted on said table for movement into and out of contact with the underside of a workpiece positioned between said centers, power operable means for opening and closing said centers to disengage and engage a workpiece positioned therebetween and for raising and lowering said jack into and out of contact with the underside of a workpiece, and automatic control means operable in response to the movement of the work table and spindle carrier to predetermined positions to cause said power operable means to open said centers, lower said jack, and initiate operation of said indexing mechanism so as to cause the work carrier to move an unfinished workpiece into position between said centers, said control means being further operable in response to the operation of said indexing mechanism to cause said power operable means to close said centers and raise said jack.

References Cited by the Examiner
UNITED STATES PATENTS

| | | | |
|---|---|---|---|
| 485,410 | 11/92 | Gill | 82—2.7 |
| 900,457 | 10/08 | Whiting | 82—38 |
| 1,612,758 | 12/26 | Becker | 82—2.7 |
| 1,713,722 | 5/29 | Steiner | 82—38 |
| 1,933,226 | 10/33 | Smith et al. | 82—2.7 |
| 1,946,429 | 2/34 | Smith et al. | 82—2.7 |
| 2,490,516 | 12/49 | Furlin | 82—2.5 |
| 2,497,170 | 2/50 | Hite | 82—38 |
| 2,539,723 | 1/51 | Branch | 82—2.7 |

WILLIAM W. DYER, Jr., *Primary Examiner.*